United States Patent [19]
Ciszek

[11] Patent Number: 5,396,332
[45] Date of Patent: Mar. 7, 1995

[54] APPARATUS AND METHOD FOR MEASURING THE THICKNESS OF A SEMICONDUCTOR WAFER

[76] Inventor: Theodoer F. Ciszek, 31843 Miwok Trail, P.O. Box 1453, Evergreen, Colo. 80439

[21] Appl. No.: 14,642

[22] Filed: Feb. 8, 1993

[51] Int. Cl.6 .............................................. G01B 11/06
[52] U.S. Cl. ..................... 356/382; 356/381; 250/571
[58] Field of Search ............ 356/381, 382, 372; 250/571, 239

[56] References Cited

U.S. PATENT DOCUMENTS

| | | | |
|---|---|---|---|
| 2,951,416 | 9/1960 | Shinn | 356/82 B |
| 3,732,016 | 5/1973 | Deshayes et al. | 356/161 |
| 4,166,700 | 9/1979 | Bowen et al. | 356/381 |
| 4,623,254 | 11/1986 | Imose | 356/381 |
| 4,732,473 | 3/1988 | Bille et al. | 356/372 |
| 4,878,755 | 11/1989 | Siegmund et al. | 356/382 |
| 4,914,307 | 4/1990 | Kanev | 356/387 |
| 5,054,317 | 10/1991 | Loubscher | 250/571 |
| 5,120,966 | 6/1992 | Kondo | 356/381 |
| 5,130,556 | 7/1992 | Duncan et al. | 356/387 |
| 5,177,564 | 1/1993 | Kato et al. | 356/382 |

FOREIGN PATENT DOCUMENTS

| | | | |
|---|---|---|---|
| 3-269204 | 11/1901 | Japan | 356/381 |
| 56-44802 | 4/1981 | Japan | 356/381 |
| 56-60309 | 5/1981 | Japan | 356/381 |
| 56-168502 | 12/1981 | Japan | 356/381 |
| 58-176508 | 10/1983 | Japan | 356/381 |
| 60-98303 | 6/1985 | Japan | 356/381 |
| 1-182709 | 7/1989 | Japan | 356/382 |
| 1-182710 | 7/1989 | Japan | 356/382 |
| 1-619015 | 1/1991 | U.S.S.R. | 356/381 |

*Primary Examiner*—Rolf Hille
*Assistant Examiner*—Minhloan Tran

[57] ABSTRACT

Apparatus for measuring thicknesses of semiconductor wafers, comprising: housing means for supporting a wafer in a light-tight environment; a light source mounted to the housing at one side of the wafer to emit light of a predetermined wavelength to normally impinge the wafer; a light detector supported at a predetermined distance from a side of the wafer opposite the side on which a light source impinges and adapted to receive light transmitted through the wafer; and means for measuring the transmitted light.

8 Claims, 2 Drawing Sheets

APPARATUS AND METHOD FOR MEASURING THE THICKNESS OF A SEMICONDUCTOR WAFER

CONTRACTUAL ORIGIN OF THE INVENTION

The United States Government has rights in this invention under Contract No. DE-AC02-83H10093 between the United States Department of Energy and the National Renewable Energy Laboratory, a Division of the Midwest Research Institute.

BACKGROUND OF THE INVENTION

1. Field of the Invention

The present invention relates to a method and an apparatus for accurately measuring, optically, the thicknesses of free-standing or static thin objects. In particular, the present invention relates to a method and apparatus for measuring the thicknesses of free-standing transparent, thin objects such as semiconductor wafers.

2. Background of the Prior Art

The thickness measurements of conventional semiconductor wafers is typically performed by micrometers or by noncontacting capacitance techniques. However, the use of micrometers and noncontacting capacitance techniques has a considerable number of drawbacks.

For example, the use of micrometers for measurement of thicknesses of semiconductor wafers occasions considerable amounts of mechanical damage to the wafer surface—particularly in the case of thin wafers. On the other hand, the disadvantageous aspects of using noncontacting capacitance techniques for measuring thicknesses of semiconductor wafers is that capacitance techniques are not sensitive for wafer thicknesses of 50 microns or less . . . and capacitance techniques also place restrictions on the wafer resistivity.

The disadvantages attendant to measuring the thicknesses of semiconductor wafers come at a time when there is increased interest in very thin semiconductor wafers or films for a variety of devices, including, but not limited to, strain gauges and photovoltaic devices.

A device for contactless measurement of the dimensions of objects is disclosed in U.S. Pat. No. 4,914,307, and comprises: an opaque hollow body having an opening for the introduction of the object to be measured, and at least one radiation emitter diode and a linear photovoltaic cell to generate an electrical signal indicating the quantity of radiation received. The emitter diode and the photovoltaic cell are arranged in the cavity of the body in a common plane perpendicular to the direction of introduction of the object to be measured, so that when the object is introduced into the body in the predetermined direction between the emitter diode and the photovoltaic cell, a shadow is projected that is a function of the transverse dimensions of the object. However, the device of this patent only senses edges or shadows of the objects being measured.

U.S. Pat. No. 4,732,473 discloses apparatus for and methods of determining the characteristics of semiconductor wafers, wherein the method entails providing a light beam, focusing the light beam at an entrance pupil, positioning a semiconductor wafer at a particular focal distance from the entrance pupil for reflection of the light beam by the semiconductor wafer, passing the reflected light beam through a pin hole; focusing the reflected light beam at the pin hole, and positioning a light sensor at a particular distance from the pin hole to obtain production of signals by the light sensor consistent with the characteristics of light sensed by the sensor. The apparatus of this patent uses reflected light in order to sense objects on or the topography of a surface, and does not directly address measuring thicknesses as such.

An apparatus for and method of measuring material thickness is disclosed in U.S. Pat. No. 3,732,016. The apparatus includes: a light source projecting light toward the material, a light detector receiving the projected light from the material and providing electrical signals corresponding thereto, a converter receiving the electrical signals and providing oscillating output signals having a frequency dependent upon the electrical signals, and a counter receiving the output signals to represent the thickness of the material by the count stored therein. However, the apparatus uses variations in transmitted light, and the film is continuously moving pass the light source and photocell. In all cases, the signals from the photocell are converted to oscillating signals over a specified period of time, and counting of the oscillations over the time period allows determination of the thickness. The apparatus does not appear to be related to measurement of thicknesses of a static object.

U.S. Pat. No. 5,130,556 discloses an optoelectronic position-sensitive detector used to measure fiber thicknesses. The position-sensitive detector is disposed at one side of a sensing region, wherein the light source is directed toward the position-sensitive detector to illuminate the same, so that an object present in the sensing region blocking a portion of the light effects a shadow on at least a portion of the position-sensitive detector, and electronic means receive and compare output signals from the position-sensitive detector to obtain a resultant single output signal, which indicates the lateral position or size variation of the object within the sensing region. However, the detector in this patent only senses edges of an object in order to deduce its width or thickness.

A method of and apparatus for measuring film thicknesses in the area of 10 nm is disclosed in U.S. Pat. No. 5,120,966, and comprises means for applying light in the ultraviolet region toward a transparent thin film on a sample, means for measuring energy of light reflected by the object sample; and means for obtaining the thickness of the transparent thin film on the basis of the energy value measured by a measuring means. This method uses reflected light to determine thicknesses of a transparent film on a substrate. It is not used for determining thicknesses of free-standing or substrate-free objects.

Therefore, there is a need extant in the semiconductor art to evolve and devise apparatus for and methods of bypassing the problems or drawbacks that accompany conventional methods for determining thicknesses of semiconductor wafers. Toward these ends, the present invention utilizes light absorption as a gauge of thickness for measuring the thicknesses of semiconductor wafers.

SUMMARY OF THE INVENTION

One object of the invention is to provide apparatus for and a method of measuring the thicknesses of semiconductor wafers without encountering the drawbacks of incurring mechanical damage to the surface of the wafers caused when micrometers are utilized to measure the thicknesses of semiconductor wafers.

A further object of the invention is to provide apparatus for and methods of measuring the thicknesses of semiconductor wafers, wherein the apparatus is sensitive for wafers having thicknesses of 50 microns or less and avoids imposing restrictions on the wafer resistivity.

The foregoing, as well as other objects of the invention are accomplished by providing housing means for supporting a wafer in a light-tight environment, a light source mounted to the housing at one side of the wafer for emitting light of a predetermined wavelength so that it normally impinges upon the wafer, a light detector supported at a predetermined distance from the other side of the wafer and which is adapted to receive the light as it is transmitted through the wafer, and means for measuring the detected light being transmitted through the wafer.

The invention utilizes the realization that, for a given material and wavelength, the amount of light transmitted through a wafer automatically decreases with increases in wafer thicknesses. The amount of light detected has been found to be related to the wafer thickness in a fashion that can be calibrated, and appropriate wavelength selection allows accurate measurement of wafer thicknesses ranging from about 2 mm to less than about 20 microns (for extremely thin wafers).

DETAILED DESCRIPTION OF THE INVENTION

Because the semiconductor technology has undergone a continuing series of advances, semiconductor chips have become progressively reduced, thereby enabling very thin semiconductor wafers or films to be utilized in a variety of devices. As an example, it is known that the centerpiece of a microcomputer can be provided on a semiconductor chip no larger than about one-quarter of an inch by one-quarter of an inch, and in the space in this reduced size semiconductor chip, thousands of circuits may be provided, and the circuits are quite small. Further, the thicknesses of the circuits may be on the order of a few microns.

Very thin semiconductor wafers or films of, for example, thin silicon are useful for strain gauges as well as for photovoltaic devices; however, it is known that thickness measurements of conventional semiconductor wafers may be accomplished by 1) the use of a micrometer; or 2) by noncontacting capacitance techniques, and that the foregoing thickness measurement techniques are encumbered by severe drawbacks. For example, in the case of the use of micrometers, mechanical damage can be introduced into the wafer surface, and this is particularly true in the case of thin wafers. When capacitance techniques are utilized to measure the thickness of semiconductor wafers, it is found that the capacitance techniques are not sensitive for wafer thicknesses of 50 μm or less, and that the capacitance techniques place restrictions on the resistivity of the wafer. The present invention recognizes that semiconductor wafers absorb some of the light that strikes them, and the amount of light absorbed is a function of the absorption coefficient, light wavelength, and the wafer thickness. For a given material and wavelength, the amount of light transmitted through the wafer monotonically decreases with increasing wafer thickness. The apparatus devised in the present invention utilizes this principal for thickness measurement, and recognizes that even silicon wafers with thicknesses below 40 μm even transmit some far-red visible light.

In essence, the present invention bypasses the problems attendant to measuring thicknesses of semiconductor wafers via micrometers and capacitance techniques by using light absorption as a gauge of thickness.

Figure 1:
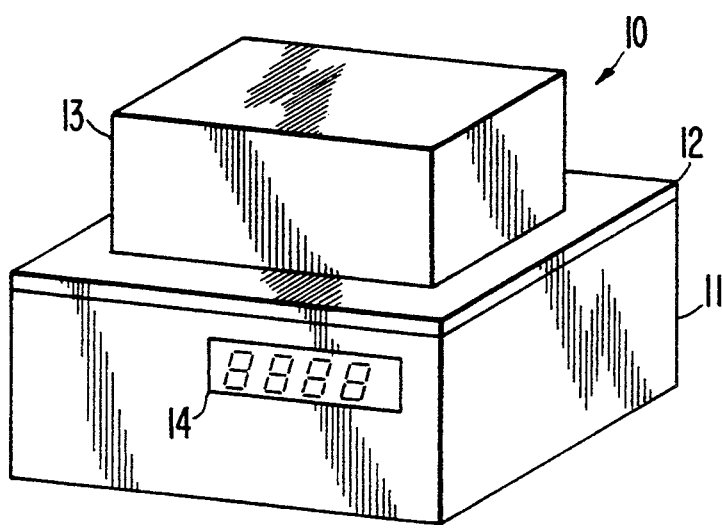
FIG. 1 is a view in perspective of the apparatus, in which a small enclosed base houses the electronics, including a digital volt meter (DVM) and power switch, a top plate of a base unit that houses a light emitting diode LED and the light from the LED that shines upward through a small opening in the top plate over which a wafer rests, and a light-tight cover box disposed over the top plate to exclude stray room light.

Referring now to FIG. 1, it may be seen that the apparatus 10 for measuring the thickness of a semiconductor wafer includes a base 11 which houses the electronics including a DVM volt meter and power switch. The enclosed base may also include a selector switch to choose different $R_B$'s and hence different LED intensity ranges, or even a selector switch to choose different wavelength LEDs. A top plate 12 of the base unit houses the LED, and the light from the LED shines upward through a small opening in the top plate, over which the semiconductor wafer rests. A light-tight cover box 13 is placed over the top plate in a manner so that it rests on the top plate to exclude stray room light. As mentioned, the enclosed base element of the apparatus includes a DVM volt meter depicted as reference 14.

Figure 2:
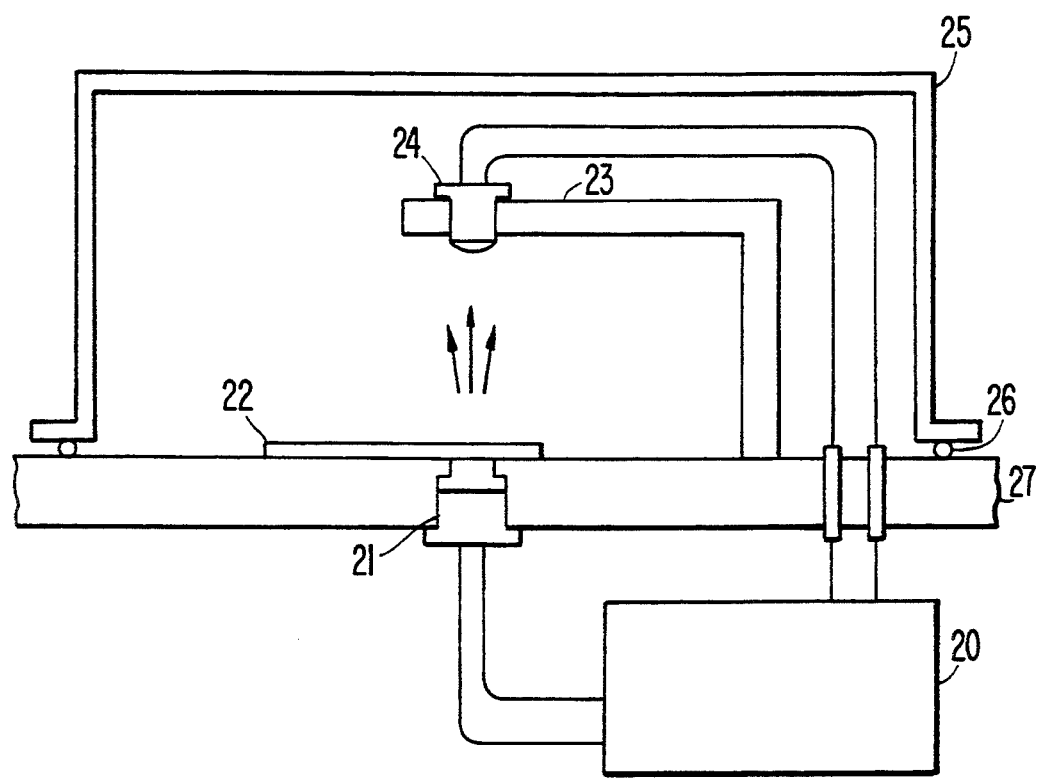
FIG. 2 is a view in section of a portion of the apparatus of FIG. 1, wherein an arm holds the light detector above a wafer at a fixed height, and wherein the wafer for thickness measurement is disposed over the LED.

From the view in section of FIG. 2, it can be seen that the electronics unit 20 of the enclosed base may, in addition to including a DVM volt meter and power switch, also include a selector switch to choose different $R_B$'s and therefore different LED intensity ranges for the LED 21, or a selector switch to choose different wavelength LEDs. It can be seen that the top plate of the base unit houses the LED and the light from the LED shines upward through a small opening in the top plate, over which a wafer 22 rests. An arm 23 holds the light detector 24, (which may be a photodarlington detector of the type MDR 360) above the wafer at a fixed height. A true contactless measurement could also be attained by floating the wafer on an air/gas cushion. The FIG. 2 light-tight cover 25 may rest upon a seal 26 disposed between the light-tight cover and the top plate 27.

Figure 4:
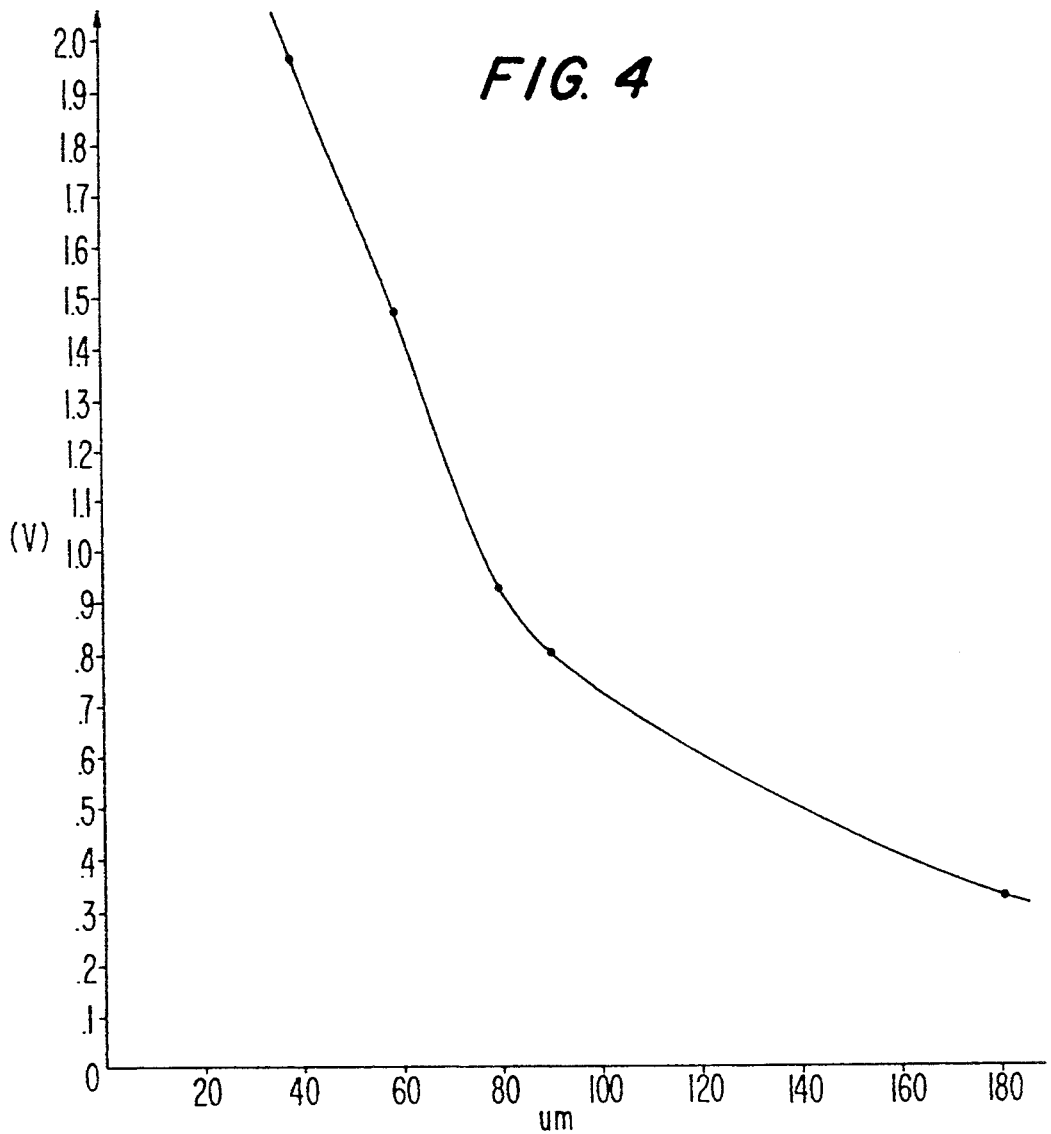
FIG. 4 is a graph with $R_L=100$ Ohm showing the voltage on the DVM vs. thickness (as independently determined with a micrometer) for a wafer thickness in the range of 40–180 μm.

A breadboard prototype using a 930–940 nm LED and a type MDR 360 photo-darlington light detector was utilized, with $R_L=100$ Ohm, to produce the graph of voltage on the DVM vs thickness shown in FIG. 4 (as independently determined with a micrometer) for wafer thicknesses in the range of 40–180 μm, and this verifies the utility of the method. A simple PC computer algorithm may be used with such a calibration curve to directly yield wafer thicknesses from the voltage measurement.

Figure 3:
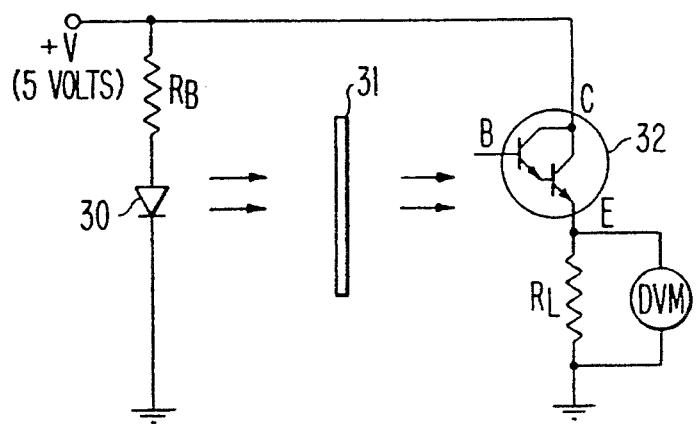
FIG. 3 shows the basic electrical circuit for the apparatus of the invention.

FIG. 3 shows the electrical circuit utilized in the apparatus for measuring the thickness of a semiconductor wafer of the invention. In said figure, a light source of appropriate wavelength is provided by a light emitting diode (LED) 30.

The electrical circuit provides a reference potential and ground potential. Connected to the reference potential is a resistor $R_B$ which is connected in series to a light emitting diode. The emitter of the light emitting diode is connected to the ground potential. Also connected to the reference potential is a photo-detector which is connected in series to a resistor $R_L$ which is connected to ground potential. Connected across the resistor $R_L$ is a digital volt meter (DVM). A wafer 31 is disposed between the light emitting diode 30 and the photodetector 32 such that light emitted by the light emitting diode passes through the wafer 31 and is detected by the photodetector 32. The photodetector 32 outputs a signal indicating the amount of light passing through the wafer 31. The signal output by the photodetector 32 passes through the resistor $R_L$ and is measured by the digital volt meter.

In this connection, various standard wavelengths are commercially available (i.e. 640 nm, 670 nm, 880 nm, 940 nm, 1300 nm, etc.). The visible red wavelengths (640–720 nm) are most appropriate for measuring extremely thin ($< \approx 20$ μm) silicon wafers, near infrared wavelengths (880–940 nm) are more appropriate for wafer thicknesses in the range 20–200 μm, and further infrared wavelengths (940–1300 nm) are most appropriate for measuring wafer thicknesses in the 200 μm–2 mm range. Light from the LED is passed through the wafer 31 whose thickness is to be measured. The light impinges on a light detector placed at a fixed distance from the LED. The amount of light detected is related to the thickness in a manner that can be calibrated, as shown in FIG. 4. A suitable detector 32 is a photodarlington transistor, in which case a voltage output is obtained that increases with decreasing thickness of the wafer; however, any photodetector that is capable of using light absorption as a gauge of thickness may be utilized in the context of the invention.

While the invention has been described and illustrated with reference to a specific embodiment, it is to be understood that the description is by way of illustration and example only and is therefore not to be taken by way of limitation, inasmuch as the spirit and scope of the present invention is limited only by the terms of the appended claims.

What is claimed is:

1. Apparatus for optically measuring thickness of a static semiconductor wafer having a thickness of 50 microns or less, comprising:
   housing means for supporting said wafer in a light-tight environment;
   a light source mounted to said housing at one side of said wafer to emit light of a predetermined wavelength of from about 640 to about 1300 nm to normally impinge said wafer;
   a light detector supported at a predetermined distance from a side of said wafer opposite said side on which a light source impinges and adapted to receive light transmitted through said wafer; and
   means for measuring said transmitted light as voltage vs thickness of the measured wafer.

2. The apparatus of claim 1, wherein said housing comprises a base for enclosing electronics which include a digital volt meter and a power switch;
   a top plate fitted over said base that houses said light source, said top plate having an opening to permit light from said light source to shine upwardly; and
   a cover which is disposed in light-tight relationship over said top plate.

3. The apparatus of claim 2, wherein said light source is a light emitting diode.

4. The apparatus of claim 3, wherein said light detector is a photodarlington transistor.

5. A method of measuring the thickness of a static semiconductor wafer having a thickness of 50 microns or less in the apparatus of claim 1, comprising:
   disposing said wafer between said light source of said predetermined wavelength, that emits light to normally impinge said wafer on one side and a light detector supported at a predetermined distance from a side of said wafer opposite said side on which a light source impinges; and
   measuring light transmitted through said wafer using a digital volt meter to compare voltage to thickness of said wafer.

6. The method of claim 5, wherein said housing comprises:
   a base for enclosing electronics which include said digital volt meter and a power switch;
   a top plate fitted over said base that houses said light source, said top plate having an opening to permit light from said light source to shine upwardly; and
   a cover which is disposed in light-tight relationship over said top plate.

7. The method of claim 6, wherein said light source is a light emitting diode.

8. The method of claim 7, wherein said light detector is a photodarlington transistor.

* * * * *